Dec. 2, 1952  J. L. ATWOOD ET AL  2,620,150
AIRPLANE CONTROL

Filed April 22, 1946  4 Sheets-Sheet 1

INVENTORS
JOHN L. ATWOOD
KNUT HENRICHSEN

ATTORNEY

Dec. 2, 1952   J. L. ATWOOD ET AL   2,620,150
AIRPLANE CONTROL

Filed April 22, 1946   4 Sheets-Sheet 2

INVENTORS
JOHN L. ATWOOD
KNUT HENRICHSEN
BY Lynn H Latta
ATTORNEY

Dec. 2, 1952  J. L. ATWOOD ET AL  2,620,150
AIRPLANE CONTROL

Filed April 22, 1946  4 Sheets-Sheet 3

INVENTORS
JOHN L. ATWOOD
KNUT HENRICHSEN
By Lynn Latta
ATTORNEY

Dec. 2, 1952   J. L. ATWOOD ET AL   2,620,150
AIRPLANE CONTROL
Filed April 22, 1946                4 Sheets-Sheet 4

INVENTORS
JOHN L. ATWOOD
KNUT HENRICHSEN
BY Lynn Latta
ATTORNEY

Patented Dec. 2, 1952

2,620,150

UNITED STATES PATENT OFFICE 2,620,150

AIRPLANE CONTROL

John L. Atwood and Knut Henrichsen, Los Angeles, Calif., assignors to North American Aviation, Inc.

Application April 22, 1946, Serial No. 664,044

20 Claims. (Cl. 244—82)

This invention relates to automatic airplane control. Its general object is to provide mechanism for neutralizing or reducing acceleration or components of total acceleration of the airplane or more specifically the airplane's center of gravity in a direction normal to the flight path, and in the airplane's plane of symmetry, when the airplane encounters air turbulence or atmospheric disturbances, commonly known as "gusts." For brevity in nomenclature, such accelerations are hereafter referred to as "vertical" accelerations, irrespective of the airplane's attitude.

Applicants' arrangement is for use with a normally stable airplane. By a stable airplane is meant an airplane which, when displaced from its initial state of trim while in flight, tends to return to such state rather than to diverge therefrom by way of either a catastrophic divergence or short period oscillations of increasing amplitude.

We are aware that a large amount of work has been done in the field of automatic aircraft control. There is for example the automatic pilot which operates the controls of an airplane to maintain the airplane on a course of fixed direction, and in a fixed attitude relative to the local zenith-nadir line. The automatic pilot does not, however, prevent gusts from causing vertical accelerations of the airplane. The automatic pilot is usually governed by gyroscopic means and even when completely effective can only maintain the airplane in a constant attitude. Since substantially all the lift of the airplane is developed by the wing it follows that accelerations are generated primarily "vertically" by atmospheric gusts which effectively change the angle of relative airflow with respect to the wing. Such accelerations result in discomfort to the passengers and crew and place additional stresses on the structure of the airplane. Our invention deals with the minimizing of these accelerations.

A further feature of some automatic pilots is a so-called automatic constant altitude control. This type of control receives its impulses from a barometer and these impulses control an actuator which operates the airplane's elevator controls. When a gust causes a change in the airplane's barometric altitude, this control steers the airplane back to a certain selected barometric altitude. This action is initiated only after the airplane's altitude has been changed by the gust, and therefore has been subjected to acceleration. This type of automatic altitude control is not intended to reduce vertical accelerations, and it does not perform this function to any material degree.

Attempts have been made to reduce the vertical acceleration of the airplane's center of gravity by permitting the wings to deflect elastically about a fore and aft hinge next to the fuselage, causing a change in dihedral angle. This type of device has not proven successful and is basically unsatisfactory for the purposes of our invention. That device does not become effective until the gust has already exerted an accelerating force on the wings. The accelerating force exerted against the wing is opposed by the inertia of the wing and its contents. The elastic suspension of the wing must exert an increasing reaction against the wing deflection as the dihedral changes from its normal angle, thereby causing vertical acceleration of the airplane's center of gravity. Consequently the device does not neutralize vertical accelerations.

A third arrangement which has been proposed for reducing vertical accelerations caused by gusts would employ a wing hinged to the fuselage on a transverse or spanwise axis and allowed to trim itself independent of the fuselage attitude in pitch. This floating wing would be rendered stable as an independent airplane by means of sweep-back or sweep-forward, horizontal tail surfaces, or other known means. Encountering a gust, the wing would tend to maintain a constant angle of attack relative to the airstream, and therefore tend to "spill" the gust and avoid vertical acceleration. However, the rotational inertia of the wing itself must be overcome in such a device, and vertical accelerations will be transmitted from the wing to the fuselage. Furthermore, such devices have not proven to be practical.

A conventional airplane possessing longitudinal static stability has a tendency to "spill" a gust. The change in angle of attack incident to an airplane encountering a vertical gust causes a lift increment which in a statically stable airplane acts a short distance aft of its center of gravity. This distance, however, is so short as compared to the radius of gyration of the airplane's mass in pitching that the motion caused by the lift increment consists principally of a "vertical" motion of the center of gravity, and only a very slow rotation in pitch.

In these arrangements wherein it has been proposed to control the elevators in response to the effect of gusts on a gust sensitive device in a manner tending to "spill" the gust, it has been found that the rate of pitching rotation which can be obtained by means of elevator control is far too slow to relieve the effect of the gust. Even if a sufficiently high rate of pitching rotation were possible, the resulting accelerations at points within the airplane, and at some distance from the center of gravity would cause discomfort to crew and passengers, and would create considerable structural stresses.

Since the operations of the devices discussed in the preceding paragraphs involve the acceleration of considerable masses, these devices are fundamentally unsuited for the purpose of reducing vertical accelerations of the airplane's center of gravity.

In contrast to these earlier efforts, our invention provides means for measuring the effect of an approaching gust, and to change the lift characteristics of the wing before or during the impingement of the gust on the wing, in such a manner, and at such a rate that the airplane will pass through the gust with a minimum of vertical acceleration.

Toward the attainment of the aforesaid objects, the invention contemplates a control mechanism utilizing a detecting device or feeler (any device that is sensitive to direction and speed of air) arranged to transmit a response to an air disturbance to controls that effect changes in wing lift characteristics. The device is located ahead of the wing surface so as to have an anticipating action. By thus changing the wing lift characteristics (as contrasted to bodily rotating the wing or changing its angle of incidence by pitching the entire airplane) we practically eliminate vertical acceleration of any part of the mass of the airplane, and by properly correlating the position of the feeler ahead of the wing, the rapidity of response of the control operating mechanism, and the normal cruising speed of the airplane, we effect changes in wing lift characteristics such that the airplane will pass through the gust at nearly constant aerodynamic lift. By normal cruising speed is meant the speed at which the airplane is designed to normally cruise, and may be termed the designed cruising speed of the airplane.

The changes in wing lift characteristics referred to can be accomplished in a variety of ways. The preferred means for changing wing lift characteristics comprises trailing edge flaps designed to deflect upwardly as well as downwardly. The flaps used for this purpose may extend over the entire or over only part of the wing's trailing edge. Furthermore, these flaps may be constructed as the rear part of the conventional landing flaps and possibly of the ailerons.

Other possible means for changing wing lift characteristics includes such well known devices as split flaps on top and bottom of the wing surface, spoilers on top and bottom of the wing surface, and boundary layer control devices. In the following discussion reference will be made to the preferred flaps only, although it must be understood that the alternate devices mentioned above would serve the same purpose, and could be controlled in a similar manner.

The feeler controls the operation of servo mechanism which actuates the flap controls. The feeler may be in the form of a weathercock or vane rotating on a horizontal spanwise axis. The weathercock alone will cause correction for changes in direction of airflow, which is the major cause of vertical accelerations.

The feeler airfoil may also be mounted in a substantially fixed position relative to the wing, the support therefor incorporating means for measuring the aerodynamic lift on the feeler airfoil. Such measurement of lift in conjunction with a measurement of dynamic pressure by a Pitot tube, may be utilized to correct for changes in airflow direction alone, or to correct for changes in direction as well as speed of airflow.

The feeler may operate through a pilot valve or an electric relay to control the operation of servo mechanism which may be hydraulic, pneumatic, electric, or aerodynamic, and which is adapted to develop ample power to actuate the flap controls.

One of the objects of the invention is to provide an arrangement in which the pilot device operated by the feeler is extremely sensitive, and capable of being actuated by a very slight amount of force. This pilot device in turn is adapted to control the operation of a relay which as previously stated controls the power required for actuating the flap controls.

It has been demonstrated that the change in lift of an airfoil subject to an instantaneous change of air speed and angle of attack, takes place gradually. It is consequently not necessary or desirable to effect an instantaneous flap deflection even if this were mechanically feasible.

The time interval during which the wing lift would change if the flap were not deflected must therefore be utilized for a gust-neutralizing flap deflection. The beginning of the flap deflection period is determined by the forward location of the feeler relative to the wing, and the rate of flap deflection is controlled by the flap actuating mechanism. This rate should either be predetermined for the normal speed of flight, or may be varied by utilizing a means for measuring the true air speed so as to maintain a rate at all times proportional to the true air speed of flight.

The purpose of the invention, namely to maintain a constant lifting force on the airplane, can be expressed mathematically as follows:

*Equation 1*

Gross weight of airplane = lift =

$$\frac{1}{2}\rho V^2 S_w \left(\frac{dC_L}{d\alpha}\right)(\alpha + f'[\delta_f])$$

Where:

$\rho$ = Air density
$V$ = True air velocity
$S_w$ = Wing area
$dC_L$ = Differential of airplane lift coefficient
$d\alpha$ = Differential of angle of attack
$\alpha$ = Angle of attack of airplane measured from angle at which $C_L = 0$ when the flap is in its neutral position, i. e. when $f'[f] = \delta_f = 0$
$\delta_f$ = Angle of flap deflection with respect to the wing
$f'[\delta_f]$ = A function of $\delta_f$ In Equation 1:

$$S_w \text{ and } \frac{dC_L}{d\alpha}$$

are constants, determined by the geometrical configuration of the airplane.

$\rho$ varies with altitude, but does not change perceptibly while the airplane passes through a gust.

$V$ and $\alpha$, either singly or together, undergo rapid changes in a gust, causing lift changes on the airplane if $\delta_f$ is constant.

Equation 1 shows that lift changes can be avoided if $\delta_f$ is changed simultaneously with changes in $V$ and $\alpha$ in such a manner as to maintain the relation given by Equation 1 (constant lift) when $V$, $\alpha$, and $\delta_f$ are the only variable.

It is demonstrated easily that for a high speed airplane the changes in V occurring in a gust cause a very minor change in lift as compared to lift changes caused by changes in $\alpha$ due to a gust. The preferred mechanism has therefore been designed treating V as a constant in Equation 1 thus making $\delta_f$ a funtion of $\alpha$ only. The action of the preferred mechanism can then be expressed by:

*Equation 2*

$$(\alpha + f'[\delta_f]) = \text{Constant}$$

It is obvious that a mechanism can change $\delta_f$ exactly according to Equation 2 under certain conditions of operation such as when the change in $\alpha$ occurs at a low rate. It is also obvious that the change in $\delta_f$ will lag behind the change in $\alpha$ when the latter change occurs at a rapid rate, which is the case in some gusts. This lag is caused by the gradual build-up of lift on a feeler airfoil subjected to a rapidly changing $\alpha$, and also by the inertia of mechanical parts including the flap itself, which have to be accelerated, and then de-celerated. The lag can be reduced by application of more power to the actuating motor. The amount of lag which will cause the smallest deviation from Equation 1 can be predicted only partially by mathematical calculations, and it is necessary to resort to empirical methods to determine the optimum amount of lag. The relation required to obtain this optimum lag can be expressed mathematically by:

*Equation 3*

$$\frac{d\delta_f}{dt} = f''\left(V, \frac{d\alpha}{dt}\right)$$

Where:

$dt$ is the differential of time $t$, and the other expressions are as hereinbefore defined.

In the preferred form of mechanism Equations 1 and 2 are expected to be very nearly satisfied at one particular value of V, such as the airplane's cruising speed, and the mechanism is designed so that $$\frac{d\delta_f}{dt}$$

does not change with V, but does change with $$\frac{d\alpha}{dt}$$

in accordance with Equation 3.

It is to be understood that it may not be possible to establish perfect neutralization at each stage of the cycle of entering and leaving a gust, and consequently the invention aims at reducing vertical acceleration to a minimum rather than completely eliminating it, and the relation set forth in Equation 1 is therefore approximately, rather than perfectly maintained.

Another object of the invention is to avoid any unnecessary addition to the weight of the aircraft. In this respect, the invention contemplates the use of some type of accumulator for storing energy to be used in the actuation of the controls through the servo mechanism. This accumulator may be pneumatic (for use with hydraulic or pneumatic type servo devices) or mechanical, e. g. a flywheel (for accumulating power from an aerodynamic motor such as a wind mill or from an electric motor) or electrical, e. g. a storage battery (for use with an electrical servo device).

Another important characteristics of the invention is the recognition of the necessity for correlating the operation of our automatic control mechanism with the operation of the normal controls of the aircraft. A control mechanism set to function in accordance with Equation 1 would, if not connected to the normal elevator controls of the airplane, prevent the change in lift desired when the elevator is deflected. Accordingly, another important object of the invention is to provide means for trimming the feeler by means of normal elevator control movements in order that lift changes become possible as a function of elevator deflections.

In this respect, the invention may utilize a simple mechanical hook-up between a trim-tab on the feeler and the main longitudinal (elevator) control mechanism of the airplane.

Where a feeler in the form of a device for measuring lift and air speed is employed, however, this adjustment may be accomplished by changing the response of the flap operating mechanism to changes in the lift on the feeler, and this is particularly feasible where electronic mechanism for transmitting the response to the measurments of lift and air speed, is employed.

Another important characteristic of the invention is the restriction of the operation of our automatic compensating mechanism to the neutralizing of vertical acceleration. No attempt is made to neutralize changes in drag forces. We make no attempt to control the plane in response to change of altitude. Instead, our invention is adapted to prevent changes in altitude where the regular controls of the plane are set for horizontal flight, and to maintain a rate of change in altitude where the regular controls are set for climbing or diving. That is, the invention acts to maintain a rectilinear flight path, free of vertical acceleration.

The mechanism is particularly useful when it is operating on an airplane which also has an automatic pilot.

In such an arrangement, the functions of maintaining a predetermined direction of flight, and correcting the flight path whenever yawing, rolling or pitching inconsistent with the predetermined flight direction, occur, are handled by the automatic pilot mechanism. The invention supplements this action of the automatic pilot mechanism by smoothing out the vertical offsets in the flight path that would otherwise occur as the result of gusts. It is therefore an object of the invention to provide an automatic control mechanism adapted to function as an adjunct to an automatic pilot mechanism, to neutralize vertical acceleration arising from gusts, and to leave to the automatic pilot mechanism the more general functions of maintaining a predetermined direction of flight and correcting the flight path and the trim of the plane after the occurrence of yawing, rolling, etc.

Other objects of the invention will become apparent from the following specification and appended drawings, in which.

While, as previously indicated, the invention may take various forms, we have chosen for the purpose of illustration, an arrangement in which the gust sensitive device is in the form of a weathercock feeler (indicated generally at 15 in Fig. 3) wherein the relay comprises a valve unit 16, wherein the servo mechanism comprises a hydraulic motor 17, and wherein the control is executed through flaps 18 and 18' that are attached respectively to the ailerons 19 and to the landing flaps or brakes 20.

The ailerons 19 and landing flaps 20 are provided with conventional mechanism for operating them. Since such mechanism forms no part of the present invention, it is not illustrated herein.

Figure 1:
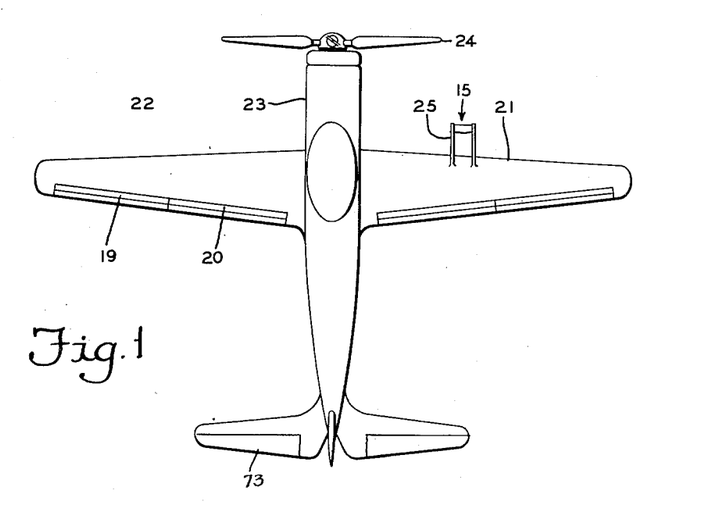
Fig. 1 is a plan view of a single engined airplane equipped with the invention.
Figure 2:
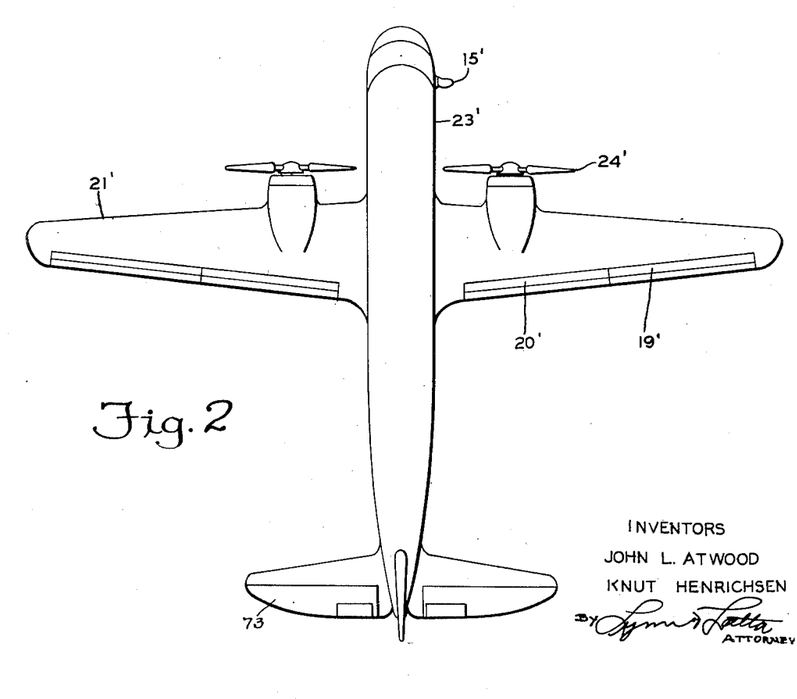
Fig. 2 is a plan view of a twin-engined airplane equipped with the invention.

The distance between the feeler 15 and the leading edge 21 of the wing 22 is determined by a number of factors, including the rapidity of response of the servomechanism, the normal cruising speed of the airplane, and the rapidity of response of the airplane to its controls. These factors may vary somewhat in different aircraft and the position of the feeler 15 is adjusted accordingly. For example, when applied to a twin-engined airplane, the feeler 15', may be located near the nose of the fuselage 23'. In this case, it may be mounted directly upon the fuselage 23' and will of course be located forwardly of the propellers 24', and therefore unaffected by the wash of these propellers. On the other hand, in a single engine craft such as a fighter plane or a small pleasure craft, the feeler may, as indicated in Fig. 1, be carried by brackets 25 projecting forwardly from the leading edge 21. In this case, the feeler is located sufficiently distant from the fuselage 23 to be out of the path of the wash from the propeller 24.

Figures 5, 9:
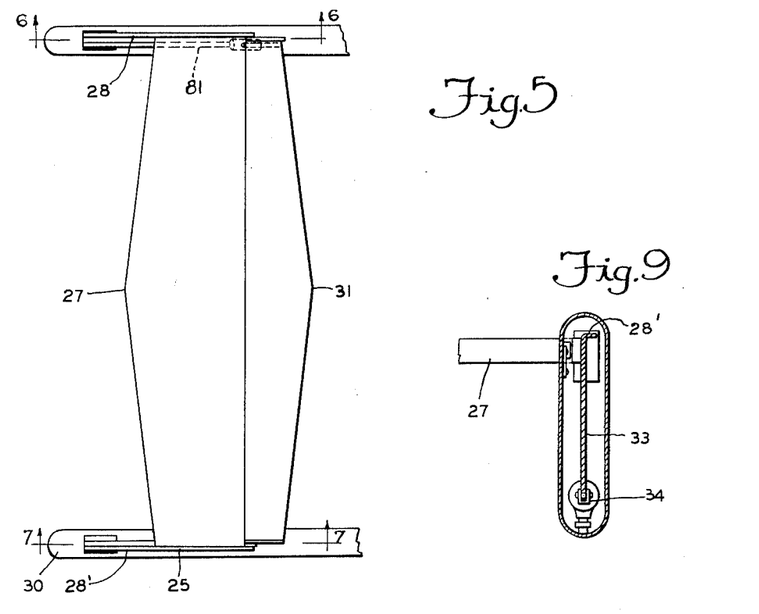
Fig. 5 is a plan view of the feeler.
Fig. 9 is a transverse sectional view taken on the line 9—9 of Fig. 7.
Figure 6:
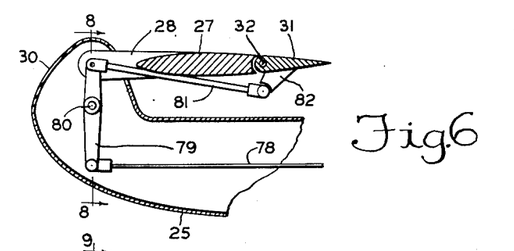
Fig. 6 is a vertical sectional view thereof taken on the line 6—6 of Fig. 5.
Figure 7:
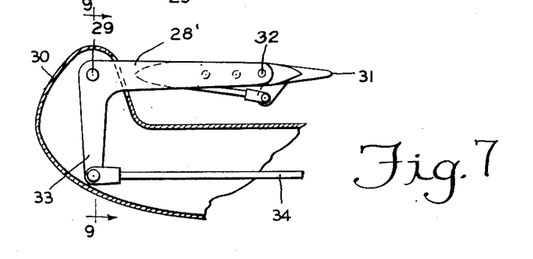
Fig. 7 is a vertical sectional view thereof taken on the line 7—7 of Fig. 5.
Figure 8:
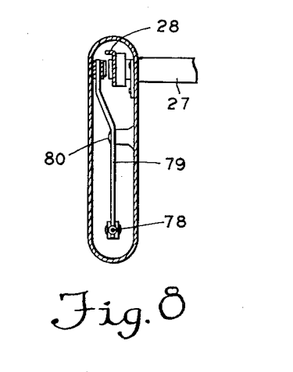
Fig. 8 is a transverse vertical sectional view taken on the line 8—8 of Fig. 6.

We have chosen, for the purpose of illustrating the details of construction of one form of mechanism that may be employed to carry out the objects of the invention, the arrangement shown in Fig. 1 wherein the feeler is supported from the leading edge of the plane wing. This plane wing 21 may be termed a basic wing since it is a suitable wing section as used in a conventional airplane. Reference is now made to Figs. 3 to 10 inclusive, showing one possible arrangement of the relay and servo mechanism operable by the feeler 15. As shown in Figs. 5—7, the feeler 15 comprises a control vane 27 the ends of which are secured to arms 28 and 28' which are pivoted, at 29, on a common axis, to the upwardly projecting forward ends 30 of the brackets 25. The feeler also includes a trimming tab 31 which is hinged at 32 to the vane 27. Although the feeler may take various forms, it is necessary that it be responsive in direction and magnitude to vertical components of airflow relative to the airplane.

The arm 28' is provided with a downwardly projecting arm 33 to which is pivoted a control transmitting rod 34. The rod 34 is slidably mounted in a bushing 35 in the forward end of the casing 36 of the relay valve 16. The rod 34 transmits the movement of the vane 27 to the control mechanism of the relay valve 16, and the relay valve 16 in turn functions to transmit movement to a control valve in the servo motor 17. Hydraulic fluid acting in the servo motor 17 transmits movement to a piston rod 37 which is connected to the automatic control vanes 18, 18' through suitable connecting mechanism. Such connecting mechanism may, for example, take the form of a quadruple arm lever 38 having an arm connected to the rod 37 and another arm connected to a rod 39 through which movement is transmitted to a crank lever 40 attached to the control flap 18'. The other two arms of the lever 38 serve to transmit movement to the remaining flaps 18, 18' through a pair of cables 41, 41' and suitable crank levers such as the three arm lever 42 shown in Fig. 3. From the intermediate arm of the lever 42, movement may be transmitted through a rod 39' and a crank lever 40' to the flap 18. A similar arrangement may be employed for transmitting movement from the wires 41, 41' to the control flaps of the other wing of the plane.

Figures 3, 4:
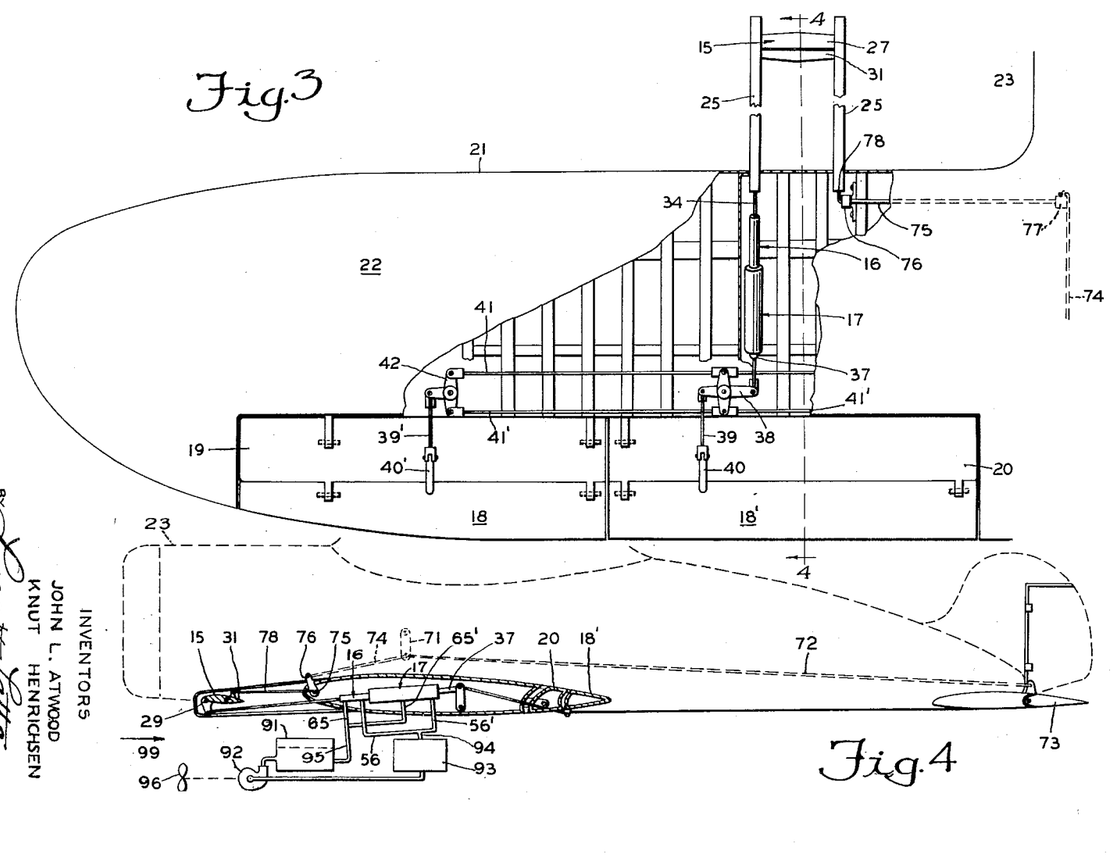
Fig. 3 is an inverted plan view of a wing of the airplane shown in Fig. 1.
Fig. 4 is a sectional view taken on the line 4—4 of Fig. 3, with the fuselage of the airplane indicated in broken lines and the control mechanism shown schematically.

The function of the vane 15 is to operate a light weight pilot valve assembly in the relay unit 16, in response to the slightest change in the direction of air movement past the feeler. Under normal cruising conditions, the feeler 15 will be positioned substantially as shown in Fig. 4, parallel to the direction of air flow approaching the leading edge 21 of the wing 22, indicated by the arrow 99 in Fig. 4.

Figures 10, 11:
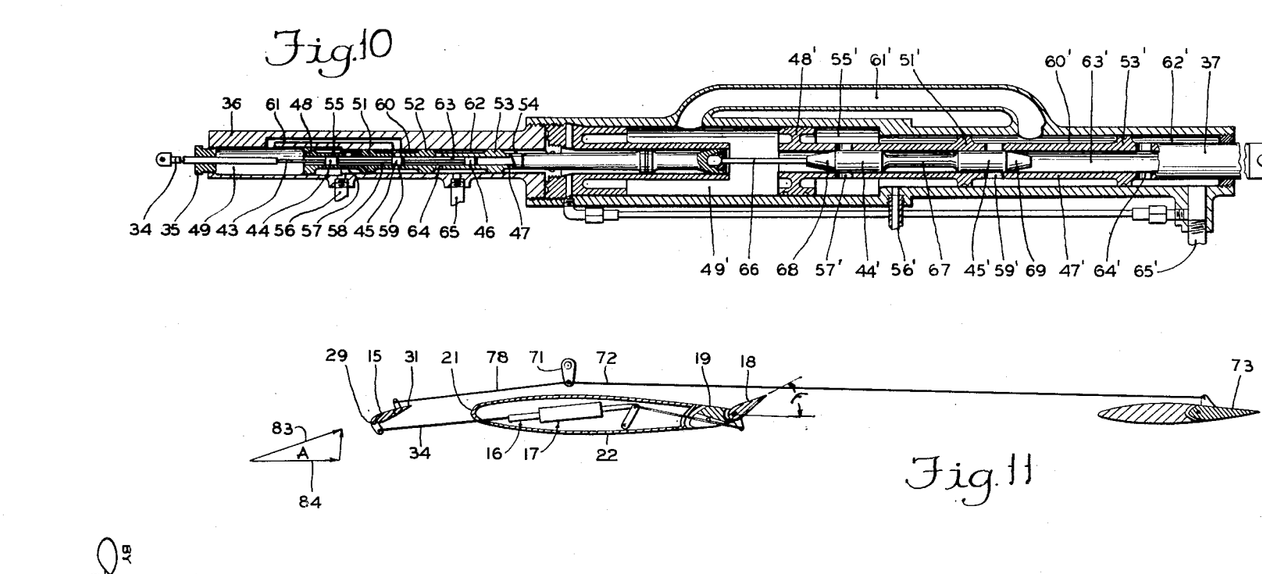
Fig. 10 is a longitudinal sectional view through the relay and servo mechanism.
Fig. 11 is a schematic illustration of one phase of operation of the invention.

When a change occurs in the direction of air flow approaching the leading edge 21, as indicated by the angle A in Fig. 11, the feeler 15 will rotate about the axis of the pivot 29, transmitting movement through the rod 34 to a cable 43 which extends through and is secured to three valve elements 44, 45 and 46, respectively. These valve elements are slidable in a bore within a relay valve sleeve 47 which functions as a follow-up member, moving in step with the movement of the pilot valve unit 43, 44, 45, 46.

An advantage of using a flexible cable 43 instead of a stiff rod or wire resides in the elimination of lateral pressure or binding of the valve elements 44, 45, 46 against the walls of the sleeve 47, as the result of stresses in the wire. The valve elements are maintained in the desired spaced relation, and the cable 43 is maintained taut, by fluid pressure.

The relay valve sleeve 47 is provided with a piston 48 which operates in a cylinder 49 in the pilot valve casing 36, and with annular lands 51, 52 and 53 which engage the wall of a bore 54 of smaller diameter than the cylinder 49. Hydraulic fluid is fed through an inlet 56, into the chamber 55 defined between the piston 48 and land 51 in the cylinder 49 and bore 54. From the chamber 55, the fluid has access through ports 57 to a chamber 58 defined between the valve elements 44 and 45 within the valve sleeve 47. The pressure on the chamber 58 is balanced against the valve elements 44 and 45, thus permitting the pressure in the chamber 49 to act against the valve element 44, maintaining tension on the cable 43 and causing the pilot valve assembly to move in unison with the movement of the rod 34. Movement of the pilot valve assembly to the right as viewed in Fig. 10 will uncover ports 59 in the relay valve sleeve 47. Communication between the chambers 58 and 49 is established through an annular chamber 60 between the lands 51 and 52 and a connecting passage 61 in the casing 50. Opening the ports 59 to the chamber 58 permits the pressure at the inlet 56 to be established in the chamber 49. This pressure, reacting against the piston 48, will overcome the lesser pressure against the piston 48 in the chamber 55 (effective upon the difference between the rear of the piston 48 and the area of the land 51) and will cause the sleeve 47 to move to the right until the port 59 is closed. When the pilot valve assembly is moved toward the left, uncovering the port 59 on the other side of the valve element 45, communication will be established between the chamber 49 and an annular chamber 62 between the lands 52 and 53. This communication is established through the passage 61, the annular chamber 60, an annular chamber 63 between the valve elements 45 and 46 within the sleeve 47, and ports 64 in the sleeve 47. From the annular chamber 62, the hydraulic fluid may escape through the outlet 65, thus relieving the pressure in the chamber 49 and permitting the pressure in the chamber 55 to move the piston 48 toward the left. Thus the valve sleeve 47 follows the movement of the pilot valve assembly in exact step therewith.

The function of the relay valve sleeve 47 is to transmit movement through a connecting rod 66 to the slidable valve unit 67 of a servomotor 17. The servomotor 17 is similar in construction to the relay valve just described, including a follow-up sleeve 47' which moves in step with the movement of the valve unit 67. This movement is transmitted through the rod 37 to the control flaps 18, 18' as previously described. Because of the similarity between the mechanism of the servomotor and the mechanism of the relay valve, we have referred to the similar parts of the servomotor by numerals corresponding to the numerals referring to the relay valve mechanism, but with the character ' added, and reference is made to the description of the relay valve mechanism for an understanding of the operation of the servomotor mechanism. The servo mechanism differs from the relay mechanism as follows:

(1) The control valve unit 67 is formed with a rigid shaft; (2) the valve elements 44' and 45' thereof are provided with conical ends 68 and 69 respectively, adapted to absorb shocks in the closing of the ports 57' and 59'; (3) the valve element 44' is arranged to normally close the ports 57' and 59' and to permit a direct passage of fluid pressure from the chamber 55' to the chamber 49' when it shifts to the right.

Accordingly, the valve element 45' functions only to release the fluid from chamber 49' through passage 61' and chamber 60' to chamber 63' and thence to the outlet 65'.

It is to be understood that the above described pilot valve, relay and servomotor mechanism are by way of illustration only and that other arrangements of relay and servomotor mechanism may be employed. For a mechanical hookup, the mechanism has the advantage of providing two stages of power amplification under the control of the pilot valve unit 43—46, the first stage being in the relay valve mechanism 47 etc., and the second stage being in the servomotor 47' etc.

The trim tab 31 is connected to a main control device in the airplane which is indicated generally at 71. This main control device may be either a joy stick for manual control or an automatic pilot mechanism. For simplicity in illustration, we have shown a simple manual control arrangement including the control device 71 and a cable 72 connecting the same to the elevator 73 of the airplane. Another cable 74 connects the control device 71 to the trim tab 31 through any suitable linkage such as the transverse rock shaft 75, crank levers 76 and 77, secured to the respective ends thereof, and the rod 78 connecting the lever 76 to the tab 31. Referring now to Fig. 6, the linkage includes means passing through the axis of the pivots 29, such means comprising a lever 79, fulcrumed at 80 on one of the brackets 25, and a rod 81 pivoted to the lever 79 at the axis of the pivots 29. The rod 81 is pivoted to an arm 82 on the tab 31. It may be noted at this point that the linkage for the trim tab 31 extends through one of the brackets 25 whereas the linkage for transmitting movement from the feeler 27 to the pilot valve extends through the other bracket 25.

In Fig. 4 we have shown, schematically, a hydraulic system that may be employed for actuating the relay valve and servomotor. Such a system may include an accumulator 91 into which hydraulic fluid is pumped by a pump 92 from a reservoir 93. An air cushion may be maintained in the top of the accumulator 91 to provide pressure for forcing the fluid through a supply line 94 to the inlet lines 56 and 56'. From the outlets 65 and 65', the fluid is returned through a return line 95 to the reservoir 93. The pump 92 may be driven by any suitable means such as, for example, an air motor 96, driven by the air stream in which the aircraft moves.

As previously noted, various types of accumulators may be employed in various types of actuating systems.

Figure 12:
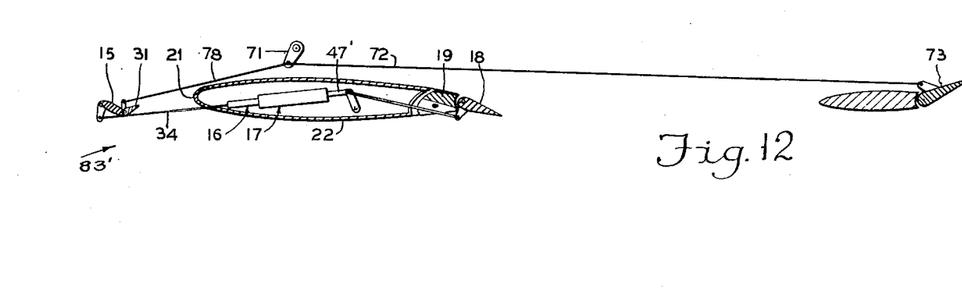
Fig. 12 is a schematic illustration of another phase of operation of the invention.

The operation of the invention is indicated schematically in Figs. 4, 11 and 12. Normally, the feeler 15 will assume a position approximately parallel to the direction of air flow indicated by the arrow 99 in Fig. 4. With the feeler in this position, the control flap 18 will assume a neutral position as shown in Fig. 4. The linkage connecting the servomotor piston rod 37 to the flaps 18, 18' is such that the ailerons 19 and landing flaps 20 may be operated without materially disturbing their relationship to the control flaps 18 and 18'.

The approach of the plane to a gust is indicated in Fig. 11. The direction of air flow in the gust area (relative to the moving plane) is indicated by the arrow 83 in Fig. 11, and the gust angle, indicated at A, is the angle between the normal direction 84 of air flow (relative to the plane) and the direction of flow in the gust.

As the feeler 15 encounters the changed direction of air flow it will respond thereto, weathercock fashion, by assuming a position parallel to the direction 83 of flow in the gust. For each change in position of the feeler 15 there will be a corresponding change in the position of the control flaps 18. The angle through which the flaps 18 change from their neutral positions to their new positions is indicated at F in Fig. 11. For any position of adjustment, there is a definite relation between the flap angle and the gust angle which is determined so as to satisfy equation (1).

The change in position of the flaps 18, 18' changes the coefficient of lift of the wing surfaces 21 in a manner to cause the plane to ride into the gust without deviating from its path of flight. For example, if the gust is an upward air current as indicated in Fig. 11, the flaps 18, 18' will move upwardly to reduce the lift, tending to cause the plane to dive, and this diving tendency will be just sufficient to counteract the tendency of the gust to lift the plane bodily out of its projected path. Conversely, if the gust is a downward movement of air, the flaps 18 will move downwardly to increase the lift and thereby counteract the tendency of the gust to move the plane bodily downwardly from its course.

It is to be understood that there may be a transition stage in the marginal area of the gust wherein the gust angle varies from zero to a maximum prevailing in the center of the gust. As each successive increment of change in gust angle is encountered by the feeler 15, there will be a corresponding change in the angle of the flap 18, just sufficient to neutralize the effect of a change in direction of air movement.

As long as the elevator 73 remains in a fixed position the trim tab 31 will likewise maintain a fixed relation to the feeler 15. However, when the elevator 73 is shifted, the trim tab 31 will correspondingly be shifted with relation to the feeler 15. This is indicated in Fig. 12, which illustrates the condition occurring immediately after the elevator has been shifted. In the example shown in Fig. 12, the elevator has been raised to cause the plane to climb. The plane has not, however, yet changed its angle of attack. The movement of the control has caused the trim tab 31 to move upwardly with reference to the feeler 15. The effect of air currents upon the trim tab 31 in this upwardly shifted position is to move the feeler 15 downwardly as indicated in Fig. 12. There will be a corresponding downward movement of the flaps 18, increasing the lift of the wing surfaces 21. When the plane has shifted to a new angle of attack (into a climb) as the result of the shifting of the elevator 73, the relative direction of the air stream with reference to the plane will have an upward component as indicated at 83'. This will cause the feeler 15 to shift back towards a neutral position, bringing the flaps 18 near their neutral position. The trim tab 31 will thus cause the airplane to fly at a higher lift coefficient than in level flight as long as the plane is climbing. In the absence of the trim tab 31, the feeler 15 would shift upwardly and cause the flaps 18 to shift upwardly as in Fig. 11, reducing the lift of the wing surfaces 21 and counteracting the climbing effect produced by the raised elevator. The operation of the trim tab 31 thus permits the main controls of the plane to operate without interference from the feeler control mechanism, and without interfering with the gust neutralizing function of the device. Accordingly, the trim tab 31, in effect, adjusts the response of the feeler to compensate for change attitudes of the airplane.

Instead of a single feeler operating the flaps on both sides of the airplane, it may in some cases be desirable to employ two or more feelers, arranged symmetrically on respective sides of the airplane. In such an arrangement, the feelers may be connected in tandem, or feelers may be connected individually to the control mechanism for just one side of the airplane or to spanwise sections or segments of flaps, or may be employed in various combinations of such arrangements.

Where a Pilot tube is employed in conjunction with the weathercock, its function is to adjust the rate of response of the servo mechanism to correspond to changes in the air speed of the airplane. For example, when the air speed increases the Pitot tube will bring about a corresponding increase in rate of response of the servo mechanism.

Furthermore, because of the lag in the rate of change of lift referred to before, it may not be necessary that the pilot vane, or feeler, be disposed ahead of the wing as generally referred to herein. The feeler may therefore be located above, below, within or even behind the wing and, when associated with sufficiently sensitive and responsive relay and servo mechanism, results in a sufficiently rapid operation of the flaps during the lag period to obtain the objects of the invention.

Summing up the essential characteristics of the invention, it may be stated generally that the invention attains the results described above by correlating: (1) spacing of feeler in advance of leading edge; (2) speed of response of relay and servo mechanism; and (3) aerodynamic characteristics of the lifting surfaces of the airplane, including the flaps 18, 18'. Approximate correlation may be attained by utilizing mathematical calculation to satisfy the equations given above, and if necessary, correlation may be completed by empirical methods, adjusting one of the three correlated factors until the effect of gusts is minimized. For example, the speed of response of the servo mechanism can easily be adjusted by varying the rate of flow of the hydraulic fluid.

We claim as our invention:

1. Control mechanism for aircraft provided with an elevator comprising a weathercock, sensitive to changes in the vertical component of movement, relative to the aircraft, of a body of air through which the aircraft is moving, means operatively connected to said weathercock and responsive thereto for changing the lift characteristics of the aircraft so as to substantially neutralize the effect of vertical gusts, and a trim tab on said weathercock, together with means for adjusting said tab in unison with the adjustment of said elevator, so as to adjust the response of said feeler to compensate for the changed angle of attack resulting from changing the position of said elevator.

2. A highly sensitive pilot valve for actuation by an air movement sensitive vane, comprising a valve cylinder, a number of valve pistons longitudinally slidable therein, and a flexible cable connecting said pistons to each other and to said vane, together with means for applying hydraulic pressure to said pistons so as to maintain said cable taut.

3. In combination with a stable airplane provided with a basic wing and controls for pitch, roll, and yaw, mechanism for materially reducing vertical accelerations of said airplane as a result of turbulence in the air through which the airplane is moving, comprising a light-weight highly sensitive feeler vane mounted on said airplane forwardly of said wing and hinged forwardly of its aerodynamic center so as to be sensitive to changes in the vertical component of air flow relative to the airplane caused by said turbulence; means on said wing for changing the wing lift characteristics thereof; and motion-transmitting means operatively connecting said feeler vane and said wing-lift-characteristic-changing means to operate the same by an amount which substantially neutralizes any effect of changes in vertical components of air force to which the airplane would otherwise be subjected before such changes of force become effective to shift the airplane vertically from its projected course.

4. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing and provided with a direction- and magnitude-sensitive part which is responsive to the vertical component of air flow relative to the airplane caused by said turbulence; means on said wing for changing the wing lift characteristics thereof; and motion-transmitting means operatively connecting said feeler and said wing-lift-characteristic-changing means to operate the same by an amount which substantially neutralizes any effect of changes in vertical components of air force to which the airplane would otherwise be subjected before such changes of force become effective to shift the airplane vertically from its projected course.

5. A device as recited in claim 4 in which said means on said wing for changing the wing-lift-characteristics thereof comprises trailing edge flaps.

6. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing, and provided with a direction- and magnitude-sensitive part which is responsive to the vertical component of airflow relative to the airplane caused by said turbulence; means on said wing for changing the wing lift characteristics thereof; and motion-transmitting means operatively connecting said feeler and said wing-lift-characteristic-changing means to maintain a constant ratio between the force applied to said direction- and-magnitude-sensitive part and said wing-lift-characteristic-changing means to maintain the lifting forces on the airplane, while cruising, substantially constant.

7. In combination with a stable airplane provided with a basic wing and controls for pitch, roll, and yaw, mechanism for materially reducing vertical accelerations of said airplane as a result of turbulence in the air through which the airplane is moving, comprising a light-weight highly sensitive feeler vane mounted on said airplane forwardly of said wing, and hinged forwardly of its aerodynamic center so as to be sensitive to changes in the vertical component of airflow relative to the airplane caused by said turbulence; flap means on said wing for changing the wing lift characteristics thereof; and motion-transmitting means operatively connecting said feeler vane and said flap means to operate the same by an amount which maintains a substantially constant ratio between the angle of inclination of said flap from a neutral position and the angle of incidence of the gust with relation to the relative direction of the air immediately surrounding the airplane, whereby to substantially neutralize any effect of changes in vertical components of air force to which the airplane would otherwise be subjected, before such changes of force become effective to shift the airplane vertically from its projected position.

8. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing and provided with a direction- and magnitude-sensitive part which is responsive to the vertical component of airflow relative to the airplane caused by said turbulence; means on said wing for changing the wing lift characteristics thereof; a relay device operatively connected to said feeler and responsive thereto; a servomotor controlled by said relay device; and control means actuated by said servomotor to operate said wing-lift-characteristic-changing means by an amount which substantially neutralizes any effect of changes in vertical component of air force to which the airplane would otherwise be subjected, before such changes of force become effective to shift the airplane vertically from its projected course.

9. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing, and provided with a direction- and magnitude-sensitive part which is responsive to the vertical component of airflow relative to the airplane caused by said turbulence; means on said wing for changing the wing lift characteristics thereof; an extremely light pilot valve actuated by said feeler; a hydraulic relay valve movable in step with the movement of said pilot valve; a hydraulic servomotor movable in step with the movement of said relay valve for actuating said lift changing means, said pilot valve, relay valve, and servomotor providing such rapidity of response to the action of said feeler as to anticipate and substantially neutralize any effect of changes in vertical component of air force to which the airplane would otherwise be subjected, before such changes of force become effective to shift the airplane vertically from its projected course.

10. In combination with a stable airplane provided with a basic wing and controls for pitch, roll and yaw, mechanism for materially reducing vertical accelerations of said airplane as the result of turbulence in the air through which the airplane is moving, comprising a light-weight, highly sensitive feeler vane mounted on said airplane forwardly of said wing, and hinged forwardly of its aerodynamic center so as to be sensitive to changes in the vertical component of airflow relative to the airplane caused by said turbulence; trailing edge flaps on said wing for changing the wing lift characteristics thereof; and motion-transmitting means operatively connecting said feeler vane and said wing-lift-characteristic-changing means to operate the same by an amount which substantially neutralizes any effect of changes in vertical components of air force to which the airplane would otherwise be subjected, before such changes of force become effective to shift the airplane vertically from its projected course.

11. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing, and provided with a direction- and magnitude-sensitive part which is responsive to the vertical component of air flow relative to the airplane caused by said turbulence; a flap mounted on said wing to move upwardly or downwardly to change the wing lift characteristics thereof; servomotor means operatively connecting said feeler and said flap; said servomotor means being correlated with the action of said feeler and the cruising speed of the airplane to maintain the lifting forces on the airplane, while cruising, substantially constant.

12. In combination with a stable airplane provided with a basic wing and controls for pitch, roll, and yaw, mechanism for materially reducing vertical accelerations of said airplane as a result of turbulence in the air through which the airplane is moving, comprising feeler means mounted on said airplane forwardly of said wing, and provided with a direction- and magnitude-sensitive part which is highly responsive to the vertical component of airflow relative to the airplane caused by said turbulence; means on said wing for changing the wing lift characteristics thereof; and motion-transmitting means operatively connecting said feeler and said wing-lift-characteristic-changing means and correlated with the cruising speed of the airplane to maintain the lifting force on the airplane, while cruising, substantially constant.

13. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing, and provided with a direction- and magnitude-sensitive part which is responsive to the vertical component of airflow relative to the airplane caused by said turbulence; flap means on said airplane for changing the lift characteristics of said airplane; and means operatively connecting said feeler and said flap means and correlating the rapidity of response of said flap means with the designed cruising speed of said airplane so as to anticipate and substantially neutralize the effect upon the airplane of vertical components of gusts, whereby to obtain a constant lifting force on the airplane to maintain the same upon a rectilinear path.

14. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing, and provided with a direction- and magnitude-sensitive part which is responsive to the vertical component of airflow relative to the airplane caused by said turbulence; means on said wing for changing the wing-lift characteristics thereof; motion-transmitting means operatively connecting said feeler and said wing-lift-characteristic-changing means; and means acting in unison with the actuation of said controls, for adjusting the response of said feeler means to compensate for a changed angle of attack produced by actuation of said controls, whereby to neutralize any effect of changes in vertical components of air force to which the airplane would otherwise be subjected, before such changes of force become effective to shift the airplane vertically from its projected course.

15. In combination with a stable airplane provided with a basic wing and controls for pitch, roll, and yaw, mechanism for materially reducing vertical accelerations of the airplane as a result of turbulence in the air through which the airplane is moving, comprising a direction- and magnitude-sensitive feeler mounted on said airplane forwardly of said wing, said feeler being responsive to the vertical component of the airflow relative to the airplane caused by said turbulence; means on said wing for changing the wing lift characteristics thereof; motion - transmitting means operatively connecting said feeler and said wing-lift-characteristic-changing means to operate the same by an amount which substantially neutralizes any effect of such vertical components and maintain the lifting force on the airplane substantially constant; and means actuated by said controls for adjusting the response of said feeler means to compensate for changed attitudes of said airplane.

16. In combination with a stable airplane provided with a basic wing and controls for pitch, roll, and yaw, mechanism for materially reducing vertical accelerations of said airplane as a result of turbulence in the air through which the airplane is moving, comprising a direction- and magnitude-sensitive feeler mounted on said airplane forwardly of said wing, said feeler being responsive to the vertical component of airflow relative to the airplane caused by said turbulence; means on said wing for changing the wing lift characteristics thereof; and motion-transmitting means operatively connecting said feeler and said wing-lift-characteristic-changing means; said motion-transmitting means being correlated with the aerodynamic characteristics of the airplane, and spacing of the feeler with respect to the airplane and the cruising speed of the airplane to maintain the lifting force on the airplane, while cruising, substantially constant.

17. In combination with a stable airplane provided with a basic wing and controls for pitch, roll, and yaw, mechanism for materially reducing vertical accelerations of said airplane as a result of turbulence in the air through which the airplane is moving, comprising a light-weight, highly sensitive feeler vane mounted on said airplane forwardly of said wing and hinged forwardly of its aerodynamic center so as to be sensitive to changes in the vertical component of air flow relative to the airplane caused by said turbulence; means on said wing for changing the wing-lift characteristics thereof; and motion-transmitting means operatively connecting and correlating said feeler vane with said wing-lift-characteristic-changing means to operate the same by an amount which anticipates and offsets the said vertical components of air force to thereby substantially neutralize any effect of changes in vertical components of air force to which the airplane would otherwise be subjected before such changes of air force become effective to change the airplane from its projected course.

18. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing and provided with a direction- and magnitude-sensitive part which is responsive to the vertical component of air flow relative to the airplane caused by said turbulence; means actuated by said controls for pitch, roll, and yaw, for adjusting the response of said feeler means to compensate for changed attitudes of said airplane; means on said wing for changing the wing-lift characteristics thereof; and motion-transmitting means operatively connecting said feeler and said wing-lift-characteristic-changing means to operate the same by an amount which substantially neutralizes any effect of changes in vertical components of air force to which the airplane would otherwise be subjected before such changes of force become effective to shift the airplane vertically from its projected course.

19. In combination with a stable airplane provided with a basic wing and controls for pitch, roll, and yaw, mechanism for materially reducing vertical accelerations of said airplane as a result of turbulence in the air through which the airplane is moving, comprising a highly sensitive feeler mounted on said airplane forwardly of said wing and provided with a direction- and magnitude-sensitive part which is responsive to the vertical component of air flow relative to the airplane caused by said turbulence; means on said wing for changing the wing-lift characteristics thereof; and servomotor means including a relay device for operatively connecting and correlating said feeler and said wing-lift-characteristic-changing means to move the wing-lift-characteristic-changing means by an amount which substantially neutralizes any effect of changes in vertical components of air force to which the airplane would otherwise be subjected before such changes in force become effective to shift the airplane vertically from its projected course.

20. In combination with a stable airplane provided with a basic wing and controls for pitch, roll, and yaw, mechanism for materially reducing vertical accelerations of the airplane as a result of turbulence in the air through which the airplane is moving, comprising a direction- and magnitude-sensitive feeler mounted on said airplane forwardly of said wing, said feeler comprising a vane hinged forwardly of its aerodynamic center and responsive to the vertical component of the airflow relative to the airplane caused by said turbulence; means on said wing for changing the wing-lift characteristics thereof; motion-transmitting means operatively connecting said feeler and said wing-lift-characteristic-changing means to maintain the lifting force on the airplane substantially constant; and means comprising a tab on said vane actuated by said controls for adjusting the response of said feeler means to compensate for changed attitudes of said airplane.

JOHN L. ATWOOD.
KNUT HENRICHSEN.

REFERENCES CITED

The following references are of record in the file of this patent:

UNITED STATES PATENTS

| Number | Name | Date |
|---|---|---|
| 1,119,324 | Sprater | Dec. 1, 1914 |
| 1,840,683 | Vance | Jan. 12, 1932 |
| 1,935,824 | Upson | Nov. 21, 1933 |
| 2,014,965 | Fischel | Sept. 17, 1935 |
| 2,041,475 | Kleisrath | May 19, 1936 |
| 2,106,684 | Ring | Jan. 25, 1938 |
| 2,156,994 | Lachmann | May 2, 1939 |
| 2,159,610 | West | May 23, 1939 |
| 2,419,298 | Stille | Apr. 22, 1947 |
| 2,428,194 | Bockrath | Sept. 30, 1947 |